United States Patent

Weitz et al.

[11] Patent Number: 4,556,401
[45] Date of Patent: Dec. 3, 1985

[54] PROCESS FOR DYEING AMIDE-CONTAINING FIBRE MATERIALS

[75] Inventors: Robert Weitz, Cologne; Rütger Neeff, Leverkusen; Herbert Hugl, Bergisch Gladbach, all of Fed. Rep. of Germany

[73] Assignee: Bayer Aktiengesellschaft, Leverkusen, Fed. Rep. of Germany

[21] Appl. No.: 637,453

[22] Filed: Aug. 3, 1984

[30] Foreign Application Priority Data

Aug. 12, 1983 [DE] Fed. Rep. of Germany ....... 3329193

[51] Int. Cl.$^4$ ............................ D06P 1/39; D06P 3/24
[52] U.S. Cl. .................................. 8/641; 8/624; 8/685; 8/687; 8/694; 8/917; 8/924; 534/652
[58] Field of Search .......................... 8/641, 694, 624

[56] References Cited

U.S. PATENT DOCUMENTS

| | | | |
|---|---|---|---|
| 2,662,074 | 12/1953 | Brooks | 534/652 |
| 2,662,075 | 12/1953 | Brooks | 534/652 |
| 3,139,420 | 6/1964 | Beffa et al. | 8/685 |

*Primary Examiner*—A. Lionel Clingman
*Attorney, Agent, or Firm*—Sprung Horn Kramer & Woods

[57] ABSTRACT

The partly known blue dyestuffs of the formula

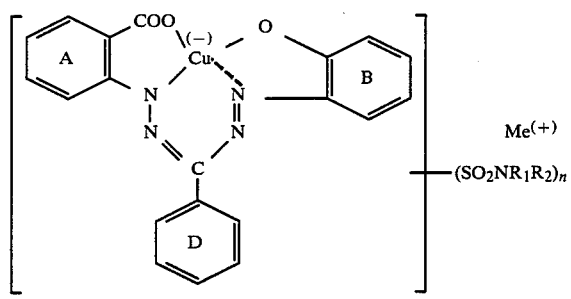

wherein
 $R_1$ denotes hydrogen, alkyl, aralkyl, alkenyl, cycloalkyl or aryl,
 $R_2$ denotes hydrogen or alkyl,
 $Me^{(+)}$ denotes a cation and
 n denotes 1 or 2, are highly suitable for the trichromatic dyeing of polyamide fibre materials, producing level dyeings thereon with a good standard of fastness.

2 Claims, No Drawings

PROCESS FOR DYEING AMIDE-CONTAINING FIBRE MATERIALS

The present invention relates to a process for the trichromatic dyeing of amide-containing fibres, in particular textile materials made of synthetic polyamides.

To date such substrates have been virtually exclusively dyed with a mixture of a red and a yellow acid dyestuff (usually from the azo series) and a sulpho-containing blue anthraquinone dyestuff.

However, the latter type of dyestuff has the disadvantage that it combines otherwise excellent fastness properties with an inadequate ozone stability and is too expensive for many spheres of application, for example mass production.

Attempts at replacing the anthraquinone blues by other less expensive blue polyamide dyestuffs, for example C.I. Acid Blues 263 and 297 (both from the formazan series), have not brought the desired success, since these dyestuffs are not readily compatible with most of the commercially available red and yellow acid dyestuffs.

It has now been found, surprisingly, that a usable trichromatic dyeing system is obtained when the previously customary anthraquinone dyestuffs are replaced by selected sulpho- and carboxyl-free non-reactive formazan dyestuffs which are structurally markedly different from the two abovementioned types and are of the general formula

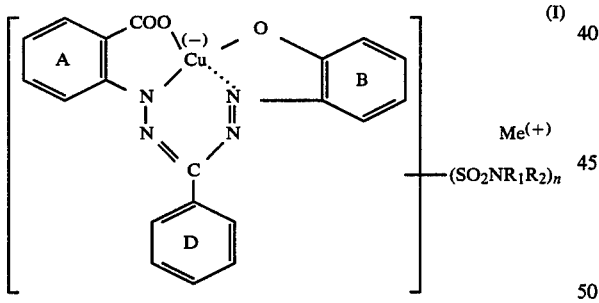

wherein
  $R_1$ denotes hydrogen, optionally substituted alkyl, aralkyl, alkenyl, cycloalkyl or aryl,
  $R_2$ denotes hydrogen or alkyl,
  $Me^{(+)}$ denotes a cation and
  n denotes 1 or 2, while rings A, B and D can carry further non-ionic substituents customary in dyestuff chemistry and the $-SO_2NR_1R_2$ radical is bonded to ring A and/or B.

The invention thus provides a process for dyeing natural and synthetic polyamide fibres which is characterised in that they are dyed with a combination of
  (a) a blue dyestuff of the formula (I) and,
  (b) a red dyestuff of the formula

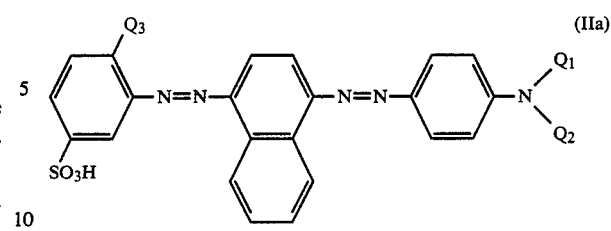

wherein
  $Q_1$ denotes $C_2H_5$ or $C_2H_4OH$,
  $Q_2$ denotes $C_2H_5$, $C_2H_4OH$,

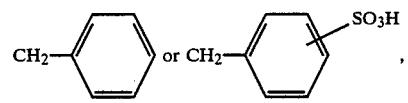

$Q_3$ denotes H, Cl or $CH_3$, or

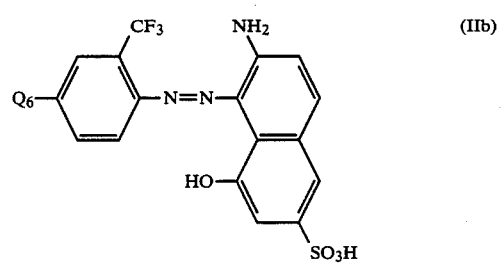

$Q_6$ = Cl or $NHCOQ_7$,
  $Q_7$ = $C_1$–$C_4$-alkyl, phenyl, cyclohexyl, NH–$C_1$–$C_4$-alkyl, NH-phenyl or NH-cyclohexyl
or

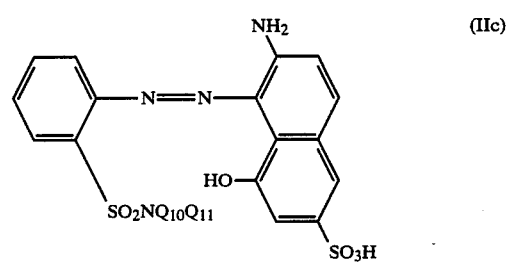

$Q_{10}$ = H, $C_1$–$C_{10}$-alkyl, cyclohexyl or phenyl, and
  $Q_{11}$ = H or $C_1$–$C_4$-alkyl, or
  (c) a yellow dyestuff of the formula

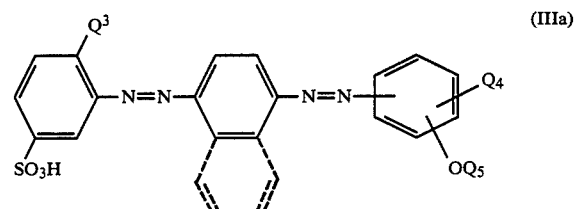

or

-continued

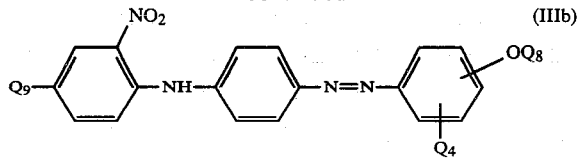

C$_2$-C$_4$—hydroxyalkyl, and

SO$_2$NHSO$_2$—C$_1$-C$_4$—alkyl wherein
Q$_4$ denotes H or CH$_3$ and
Q$_5$ denotes C$_1$-C$_4$-alkyl (preferably CH$_3$ or C$_2$H$_5$) or C$_2$-C$_4$-hydroxyalkyl (preferably CH$_2$CHOHC$_2$H$_5$)
where —OQ$_5$ is in the ortho- or para-position relative to the azo linkage.

The dyestuffs of the formula I are partly known and have been described, for example, in the following patent literature: U.S. Pat. Nos. 2,662,074, 2,662,075 and 3,139,420.

Examples of suitable substituents in rings A, B and D of the formula I are Cl, Br, F, C$_1$-C$_4$-alkyl, C$_1$-C$_4$-alkoxy, CF$_3$ and NO$_2$.

Suitable alkyl radicals in the formula I have 1-6 C atoms which can contain further substituents, in particular OH, —OC$_1$-C$_4$-alkyl and —O—C$_2$H$_4$—O—C$_1$-C$_4$-alkyl.

Suitable aralkyl radicals are benzyl and phenylethyl.
Suitable alkenyl radicals are allyl and butenyl.
Suitable aryl radicals are phenyl radicals which can be further substituted like rings A-D.
Suitable cycloalkyl radicals are cyclohexyl and methylcyclohexyl.

Preferably R$_1$ and R$_2$ are not both hydrogen, but R$_1$ represents alkyl and R$_2$ hydrogen.

Suitable Me$^{(+)}$ cations are water-solubilising ions, preferably of the alkali metal series, such as Li$^{(+0}$, Na$^+$) and K$^+$).

Preferred dyestuffs of the formula I have R$_1$=alkoxyalkyl.

The dyestuffs of the formulae II and III are almost all known and are commercially available, in some instances as commodities, under the following Colour Index names:
Acid Yellows 159, 159.1 and 242;
Acid Oranges 67, 116, 116.1 and 127;
Acid Reds 119, 299 and 299.1 and 266.

Trichromatic dyeing systems based on mixtures of dyestuffs I-III are distinguished by excellent reproducibility by virtue of the excellent compatibility of formazan dyestuffs I.

Dyeing is preferably carried out at a liquor ratio of 5:1-50:1 and temperatures of 40°-130° C. using the exhaust method.

The present invention further provides, under the heading of dyestuffs of the formula I, new formazan compounds of the formula

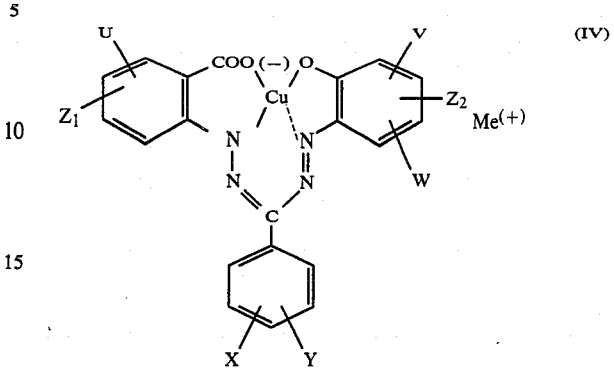

wherein
U,V,W,X and Y independently of one another each denote hydrogen, Cl, Br, CH$_3$, NO$_2$, C$_1$-C$_4$-alkylcarbonylamino or benzoylamino,
Z$_1$ and Z$_2$ each denote hydrogen or the radical of the formula —SO$_2$NR$_1$'R$_2$', but do not both denote hydrogen,
R$_1$' represents C$_2$-C$_4$-alkylene-OR$_3$,
R$_2$' represents hydrogen, C$_1$-C$_4$-alkyl or R$_1$',
R$_3$ represents hydrogen, C$_1$-C$_4$-alkyl or C$_2$-C$_4$-alkylene-OR$_3$' and
R$_3$' is hydrogen or C$_1$-C$_4$-alkyl and
Me has the above-mentioned meaning.

Preferred new formazans are of the formula IV wherein:
U, V and X each denote hydrogen, chlorine or NO$_2$ (but the three never denote NO$_2$ at the same time),
W, Y and Z$_1$ each denote hydrogen,
Z$_2$ denotes —SO$_2$NR$_1$'R$_2$',
R$_1$' denotes C$_2$-C$_4$-alkylene—O—C$_1$-C$_2$-alkyl,
R$_2$' denotes hydrogen, C$_1$-C$_2$-alkyl or hydroxyethyl and
Me$^{(+)}$ denotes a sodium ion.

The novel formazans of the formula IV can be prepared by various processes known per se. One such process is characterised in that an aromatic hydrazone compound of the general formula

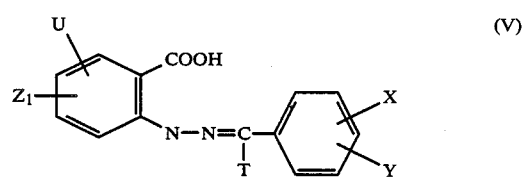

in which
U, X, Y and Z$_1$ have the abovementioned meanings and
T denotes hydrogen or a substituent replaceable by the azo coupling,
is reacted with the diazonium compound of an aromatic amine of the formula

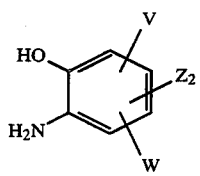

(VI)

wherein

V, W and $Z_2$ have the abovementioned meanings, and with a copper-donating agent. The process is preferably carried out at pH 7–9 and at a temperature between about 0° and 20° C.

The reactants can be added in any order, although the process can also easily be carried out in the form of a three-component reaction.

If T in coupling components of the general formula (V) denotes a substituent replaceable by azo coupling, it is preferably the formyl or carbonyl group or a substituent convertible into the carboxyl group, such as, for example, a cyano, carboxylate or carboxamide group.

The copper-donating compound can be a simple or a complex salt of copper, such as, for example, copper sulphate, copper chloride, copper acetate or copper carbonate, and the copper salt of salicylic acid or tartaric acid.

If the copper salts of mineral acids are used, the reaction is advantageously carried out in the presence of an acid-neutralising agent, such as, for example, an alkali metal hydroxide, alkali metal carbonate, alkaline earth metal hydroxide, alkaline earth metal carbonate, or an alkali metal salt of a lower alkanoic acid, such as acetic acid, or a basic alkali metal salt of phosphoric acid.

The copper-donating agent is used in equimolar amounts, so that one copper atom is present per prospective compound of the formula (I). The hydrazone compounds of the formula (V) are known and can be prepared by known methods. They are obtained for example by reacting appropriate phenylhydrazines (which can be prepared for example from the diazonium compounds of appropriate amines with salts of sulphurous acid by hydrolysis of the intermediate N-sulphonic acids with mineral acids), preferably not first isolated, with aldehydes of the formula VII

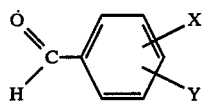

(VII)

which are likewise known and obtainable in conventional manner.

The novel formazan dyestuffs of the formula IV are distinguished by good end-use fastness properties and especially by excellent compatibility with the red and yellow dyestuffs of the formulae II and III.

They are particularly suitable for dyeing polyamide fibre materials for use in outerwear.

EXAMPLE 1

24 parts of the hydrazone prepared from benzaldehyde and 2-carboxyphenylhydrazine are dissolved in water at pH 8.5–9.5. The solution is cooled down to 0°–5° C. by addition of ice, and, while the pH is maintained, a solution of the diazonium salt of 31.1 parts of the hydrochloride of the amine of the formula

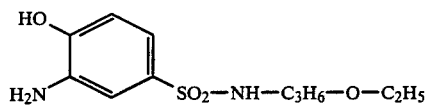

and a solution of 25 parts of copper sulphate ($CuSO_4.5H_2O$) in 100 parts of water are added. The acid is neutralised by the dropwise addition of aqueous sodium hydroxide solution.

The amine is diazotised using a known method, namely at 0°–5° C. in aqueous hydrochloric acid by the dropwise addition of 6.9 parts of sodium nitrite dissolved in 20 parts of water and destruction of any excess nitrite with sulphamic acid.

When the coupling is complete (the reaction can be monitored by thin layer chromatography) the precipitated dyestuff of the formula

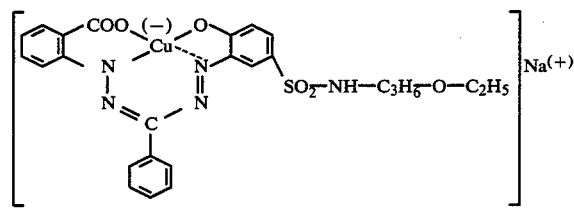

is filtered off, washed with a little water, and dried. The dark blue dyestuff obtained dyes polyamide from a neutral to weakly acid bath in relatively pure, bright blue shades of particularly good light and wet fastness properties.

EXAMPLES 2–11

If Example 1 is repeated with equimolar amounts of the hydrazones prepared from the hydrazines and aldehydes given in the table instead of the corresponding hydrazone in Example 1, this produces likewise valuable blue dyestuffs with excellent properties for dyeing polyamide.

| | Hydrazone prepared from | |
|---|---|---|
| Example | Hydrazine | Aldehyde |
| 2 | 4-Nitro-2-carboxyphenylhydrazine | Benzaldehyde |
| 3 | 5-Chloro-2-carboxyphenylhydrazine | " |
| 4 | 5-Methylsulphonyl-2-carboxyphenyl-hydrazine | " |
| 5 | 4-Acetylamino-2-carboxyphenyl-hydrazine | " |
| 6 | 5-Sulphonamido-2-carboxyphenyl-hydrazine | " |
| 7 | 2-Carboxyphenylhydrazine | 2,4-Dichloro-benzaldehyde |
| 8 | 2-Carboxyphenylhydrazine | 2-Chloro-benzaldehyde |
| 9 | " | 2-Methyl-benzaldehyde |
| 10 | " | 4-Chloro-benzaldehyde |
| 11 | " | 1-Naphthaldehyde |

EXAMPLES 12–36

If the amine in Example 1 is replaced by 29.7 parts of the o-aminophenol derivative of the formula (as hydrochloride)

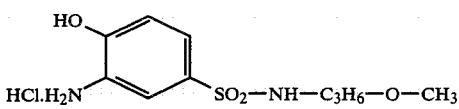

and Example 1 is otherwise repeated, this produces the dyestuff of the formula

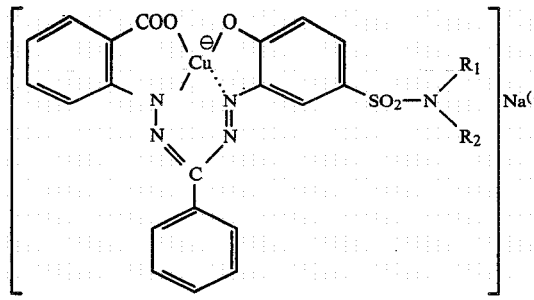

in the form of a dark powder. It dyes polyamide from a neutral to a weakly acid bath in pure, bright blue shades.

By using this process on 0.1 mole in each case of the o-aminophenols from the table below likewise excellent blue dyestuffs for the dyeing of polyamide are obtained.

| | | o-Aminophenol |
|---|---|---|
| Example | $R_1$ | $R_2$ |
| 13 | H | $C_3H_6-O-C_2H_4-OCH_3$ |
| 14 | H | $C_3H_6-O-C_2H_4-OH$ |
| 15 | H | $C_2H_4-O-C_2H_4-OH$ |
| 16 | H | $C_2H_4-O-C_2H_4-OCH_3$ |
| 17 | H | $C_2H_4-O-C_2H_4-OC_2H_5$ |
| 18 | H | $C_2H_4-O-C_2H_5$ |
| 19 | H | $C_2H_4-O-CH_3$ |
| 20 | H | $C(CH_3)_2-C_2H_4-OH$ |
| 21 | $CH_3$ | $C_3H_6-OH$ |
| 22 | $CH_3$ | $CH_2-CH(CH_3)-OH$ |
| 23 | $CH_3$ | $C_2H_4-O-CH_3$ |
| 24 | $n-C_3H_7$ | $CH_2-CH(CH_3)-OH$ |
| 25 | $C_2H_5$ | $C_2H_4-OH$ |
| 26 | $C_2H_4-OH$ | $C_2H_4-CN$ |
| 27 | $C_2H_4-OH$ | $C_3H_6-O-C_2H_5$ |
| 28 | $C_2H_4-OH$ | $n-C_3H_7$ |
| 29 | $C_2H_4-OH$ | $C_3H_6-O-CH_3$ |
| 30 | $C_2H_4-OH$ | $CH_2-CH(CH_3)_2$ |
| 31 | $C_2H_4OH$ | $n-C_4H_9$ |
| 32 | $C_2H_4-CN$ | $C_2H_4-O-C_2H_4-OH$ |
| 33 | $C_2H_4OH$ | $C_2H_4OH$ |
| 34 | $CH_2-CH(OH)-CH_3$ | $CH_2-CH(OH)-CH_3$ |
| 35 | $C_3H_6-OH$ | $n-C_4H_9$ |
| 36 | $C_2H_4-OH$ | $C_6H_5$ |

EXAMPLE 37

33 parts of the compound of the formula

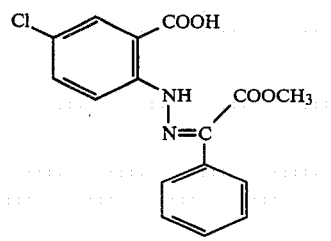

are heated to about 90°–95° C. for 30 minutes in 250 parts of water in the presence of 24 parts of 45% strength sodium hydroxide solution. When the hydrolysis is complete (thin layer chromatography), the solution is cooled down to 0°–5° C. and brought to pH 7.5–8.5 with aqueous hydrochloric acid. At constant pH, a coupling is carried out with a diazonium salt of o-aminophenol analogously to Example 1, and the product is reacted with 25 parts of copper sulphate (CuSO$_4$.5H$_2$O) to give the formazan of the formula The dyestuff dyes polyamide from a neutral to weakly acid bath in bright blue shades.

EXAMPLE 38

0.175 g of the blue dyestuff of Example 1 and 0.12 g of C.I. Acid Orange 116 are dissolved in 2000 ml of hot water, 2 g of acetic acid (30% by weight) are added, and the solution is made up to 5000 ml. 100 g of a nylon 6 fabric are added to this dyebath at about 40° C., the temperature is raised to the boil in the course of 30 minutes, and the boiling temperature is maintained for 60 minutes. The material being dyed is kept in periodic agitation, is removed from the bath after the dyeing, is rinsed with water, and is dried at 60°–70° C. The result is a very level olive dyeing with good light and wet fastness properties.

EXAMPLE 39

0.175 g of the blue dyestuff of Example 1 and 0.1 g of C.I. Acid Red 299 are used to dye nylon 6 as described in Example 38. The result is a likewise very level violet dyeing having good fastness properties.

EXAMPLE 40

0.175 g of the blue dyestuff of Example 1 and 0.16 g of C.I. Acid Yellow 242 are used for dyeing nylon 6 as described in Example 38. The result is a level green dyeing having good light and wet fastness properties.

EXAMPLE 41

100 g of nylon 6 fabric are dyed with 0.12 g of the blue dyestuff of Example 1, 0.067 g of C.I. Acid Red 299 and 0.08 g of C.I. Acid Orange 116 as described in Example 38. The result is a very level brown dyeing having good light and wet fastness properties.

We claim:

1. In the process for the dyeing of natural and synthetic polyamide fibres with a dyeing agent, the improvement wherein said agent comprises a combination of (a) a sulpho- and carboxyl-free non-reactive blue dyestuff of the formula

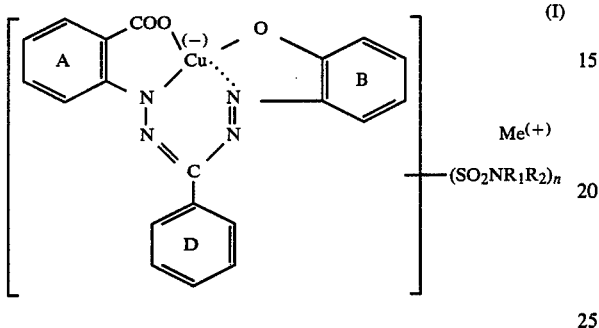

wherein $R_1$ denotes hydrogen, optionally substituted alkyl, aralkyl, alkenyl, cycloalkyl or aryl, $R_2$ denotes hydrogen or alkyl, $Me^{(+)}$ denotes a cation and n denotes 1 or 2, with the proviso that the —$SO_2NR_1R_2$ radical is bonded to ring A and/or B, while said rings A, B and D can be further substituted by Cl, Br, F, $C_1$-$C_4$-alkyl, $C_1$-$C_4$-alkoxy, $CF_3$ or $NO_2$; said alkyl radicals have 1–6 C atoms which can be further substituted by OH, —$OC_1$-$C_4$-alkyl or —$O$—$C_2H_4$—$O$—$C_1$-$C_4$-alkyl; said aralkyl radicals are benzyl or phenylethyl; said alkenyl radicals are allyl or butenyl; said aryl radicals are phenyl radicals which can be further substituted like rings A–D and said cycloalkyl radicals are cyclohexyl or methylcyclohexyl, and (b) a red dyestuff of the formula

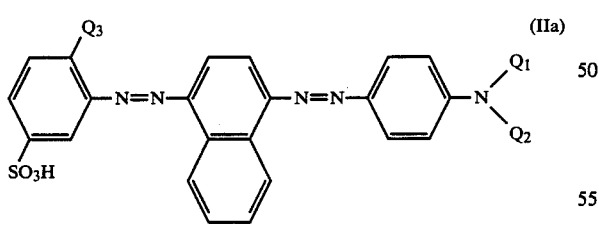

wherein $Q_1$ denotes $C_2H_5$ or $C_2H_4OH$, $Q_2$ denotes $C_2H_5$, $C_2H_4OH$,

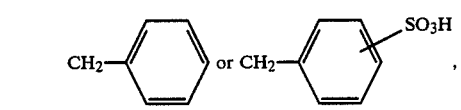

$Q_3$ denotes H, Cl or $CH_3$, or

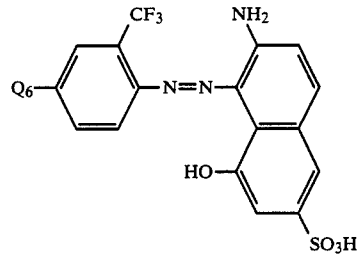

$Q_6$=Cl or $NHCOQ_7$,
$Q_7$=$C_1$-$C_4$-alkyl, phenyl, cyclohexyl, NH—$C_1$-$C_4$-alkyl, NH-phenyl or NH-cyclohexyl or

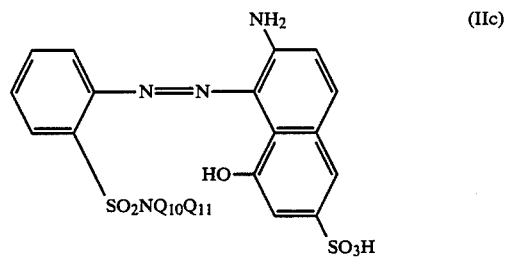

$Q_{10}$=H, $C_1$-$C_{10}$-alkyl, cyclohexyl or phenyl, and
$Q_{11}$=H or $C_1$-$C_4$-alkyl, and/or (c) a yellow dyestuff of the formula

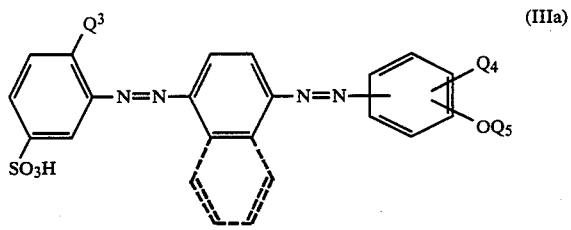

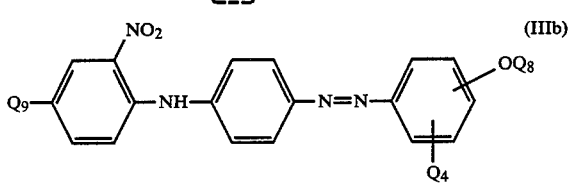

$Q_8$ = $C_1$-$C_4$—alkyl, —$SO_2$—⟨phenyl⟩ or $C_1$-$C_4$—hydroxyalkyl, and $Q_9$ = $SO_3H$, $SO_2NHSO_2$—⟨phenyl⟩ or $SO_2NHSO_2$—$C_1$-$C_4$—alkyl, wherein
$Q_4$ denotes H or $CH_3$ and
$Q_5$ denotes $C_1$-$C_4$-alkyl (preferably $CH_3$ or $C_2H_5$) or $C_2$-$C_4$-hydroxyalkyl (preferably $CH_2CHOHC_2H_5$)
where —$OQ_5$ is in the ortho- or para-position relative to the azo linkage.

2. Process according to claim 1, wherein $R_1$ is an alkoxyalkyl radical.

* * * * *